United States Patent [19]

Pu

[11] Patent Number: 5,399,332
[45] Date of Patent: Mar. 21, 1995

[54] DYNAMIC LEACHING PROCEDURE FOR METATHESIS

[75] Inventor: Chunmin Pu, Mississauga, Canada

[73] Assignee: Sterling Canada, Inc., Islington, Canada

[21] Appl. No.: 138,640

[22] Filed: Oct. 20, 1993

[51] Int. Cl.$^6$ .................. C01B 11/02; C01D 15/06
[52] U.S. Cl. .................. 423/478; 423/551; 423/522
[58] Field of Search .................. 423/478, 551, 522

[56] References Cited

U.S. PATENT DOCUMENTS

| | | | |
|---|---|---|---|
| 3,789,108 | 1/1974 | Rapson | 423/478 |
| 3,793,439 | 2/1974 | Rapson | 473/478 |
| 3,864,456 | 2/1975 | Winfield et al. | 473/478 |
| 3,975,505 | 8/1976 | Fuller | 423/478 |
| 4,081,520 | 3/1978 | Swindells et al. | 423/478 |
| 4,325,934 | 4/1982 | Swindells et al. | 423/478 |
| 4,806,215 | 2/1989 | Twardowski | 204/98 |
| 4,938,943 | 7/1990 | Norell | 423/478 |
| 4,961,918 | 10/1990 | Norell et al. | 423/479 |
| 4,978,517 | 12/1990 | Norell et al. | 423/479 |
| 5,091,166 | 2/1992 | Engstrom et al. | 423/478 |
| 5,091,167 | 2/1992 | Engstrom et al. | 423/478 |
| 5,116,595 | 5/1992 | Scribner et al. | 423/477 |
| 5,122,240 | 6/1992 | Cowley et al. | 204/101 |
| 5,205,995 | 4/1993 | Scribner et al. | 422/189 |

FOREIGN PATENT DOCUMENTS

| | | |
|---|---|---|
| 0956784 | 10/1974 | Canada . |
| 1118184 | 2/1982 | Canada . |
| 2490206 | 3/1982 | France . |

Primary Examiner—Gary P. Straub
Attorney, Agent, or Firm—Sim & McBurney

[57] ABSTRACT

Solid sodium sesquisulfate is metathesized by water to neutral anhydrous sodium sulfate and to recover the acid values therefrom by employing a dynamic leaching of the solid phase sodium sesquisulfate, to provide an acid medium for recycle to a chlorine dioxide generating process producing the sodium sesquisulfate without significantly increasing the evaporative load on the generator.

14 Claims, 1 Drawing Sheet

DYNAMIC LEACHING PROCEDURE FOR METATHESIS

FIELD OF INVENTION

The present invention relates to the metathesis of acidic by-products from the production of chlorine dioxide.

BACKGROUND TO THE INVENTION

In U.S. Pat. No. 5,205,995, there is described the metathesis of by-product sodium sesquisulfate from a chlorine dioxide generation process to recover acid values therefrom while not significantly increasing the evaporative load on the chlorine dioxide generator when the recovered acid values are recycled to the chlorine dioxide generator.

One of the agents described as being employed in the process is water but, in order to minimize water usage and consequent evaporative load on the generator, it is necessary to employ, as seen in FIG. 3 of that patent, two filters, a mixing tank and recycle of part of the resulting acidic solution to the first filter.

SUMMARY OF INVENTION

In the present invention, this prior metathesis procedure is much simplified and a single unit is utilized employing hot water leaching to effect the metathesis reaction.

Accordingly, in one aspect of the present invention, there is provided a process for the conversion of sodium sesquisulfate, particularly produced in a chlorine dioxide generation operation, to neutral anhydrous sodium sulfate, which comprises leaching the sodium sesquisulfate in solid crystalline form with an aqueous metathesizing medium for a time and at a temperature at least sufficient to effect conversion of at least a substantial proportion of the solid crystalline sodium sesquisulfate to neutral anhydrous sodium sulfate at least partially in crystalline form and to form an aqueous acid-containing medium having a total acid normality of up to about 6.5 normal.

The leaching process generally is carried out using water at a temperature of about 40° to about 100° C., preferably about 70° to about 90° C., during the leaching in a plurality of individual leaching steps on the solid crystalline sodium sesquisulfate. The individual leaching steps may be carried out by spraying water onto a bed of the solid crystalline sodium sesquisulfate and then drawing the water from the bed.

The aqueous metathesizing medium preferably is water. Alternatively to water, other aqueous metathesizing media, such as those disclosed in U.S. Pat. No. 5,205,995, namely chlorate solution, chloride solution, aqueous methanol and condensate, can be employed in the process.

The leaching process preferably is carried out by conveying a bed of solid crystalline sodium sesquisulfate on a horizontal vacuum filter belt and spraying water onto the bed at a plurality of longitudinally-adjacent locations along the length of the conveyor.

It has been found that maintaining high temperature of the solid bed is beneficial with respect to the metathesis efficiency. Thus, a steam cushion is preferably applied above the conveyor belt in the metathesis zone and the cooling effect of penetrating air is eliminated.

As the conversion from sodium sesquisulfate to neutral sodium sulfate proceeds, the saltcake becomes increasingly porous due to partial dissolution in water. Press rolls may be used between water spray bars to exert a gentle pressing so that undesired channelling of water can be minimized.

DESCRIPTION OF PREFERRED EMBODIMENT

Figure 1:
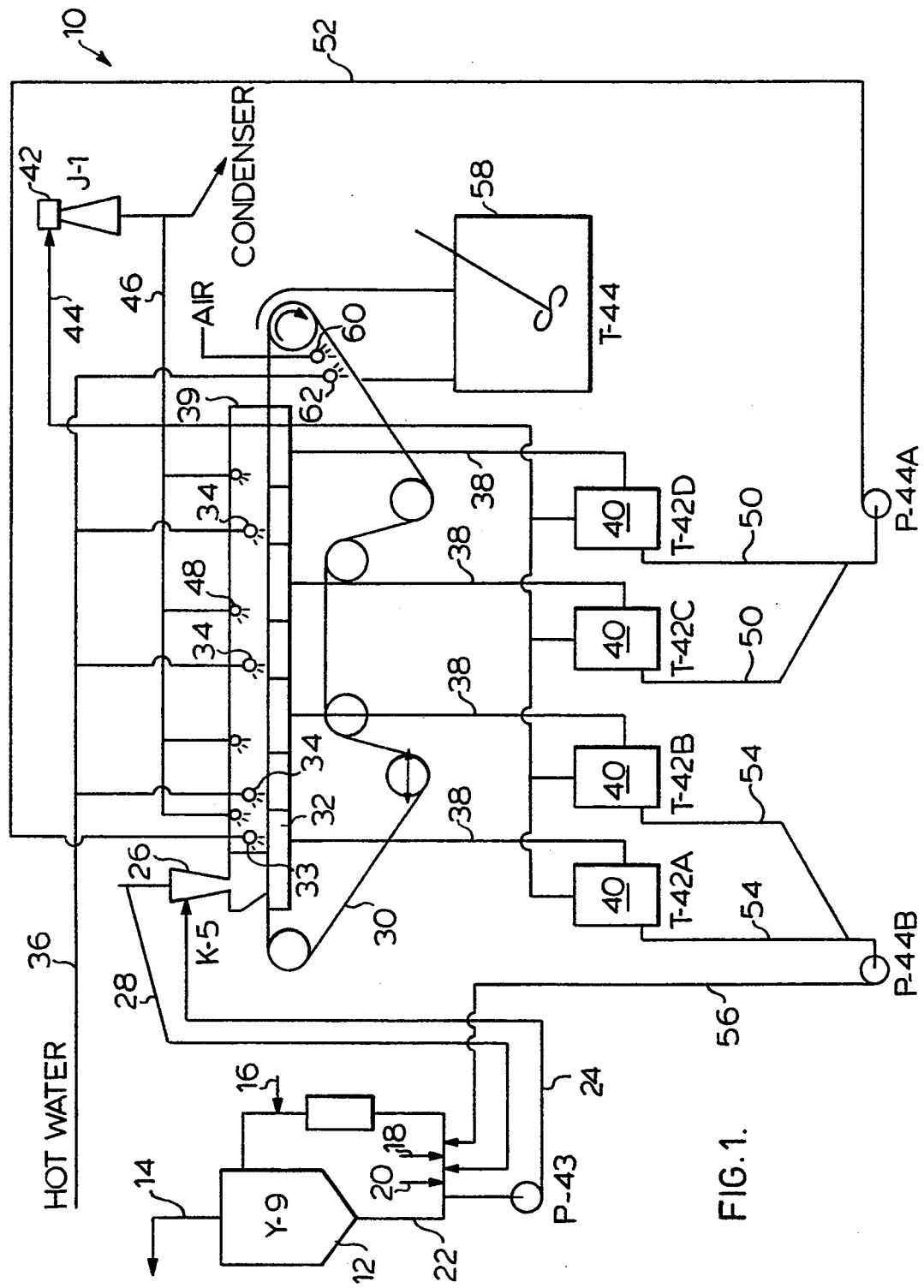
FIG. 1 is a schematic representation of a metathesis apparatus for carrying out the metathesis process according to one embodiment of the invention.

Referring to FIG. 1, there is illustrated therein one embodiment of a chlorine dioxide generating unit 10 in accordance with the invention. As seen therein, a chlorine dioxide generator 12 produces chlorine dioxide, removed in gaseous admixture with steam via line 14. Feeds of sulfuric acid by line 16, methanol or hydrogen peroxide by line 18 and aqueous sodium chlorate solution by line 20 are made to the generator 12 to provide an aqueous acidic chlorine dioxide-generating reaction medium therein which is maintained at its boiling point under a subatmospheric pressure applied thereto.

Crystalline sodium sesquisulfate is precipitated from the reaction medium under conditions of acidity of about 5 to about 11 normal and is removed in slurry form by line 22 and is pumped via line 24 to a hydrocyclone separator 26, wherein aqueous phase is separated from solid phase. The aqueous phase is recycled by line 28 to the chlorine dioxide generator recycle loop.

The solid phase crystalline sodium sesquisulfate separated in the cyclone separator 26 is deposited in the form of a mat or cake onto the upper surface of a moving foraminous vacuum filter belt 30 which is provided with longitudinally spaced-apart vacuum boxes 32 to draw liquid through the mat of crystalline sodium sesquisulfate. The equipment is designed to permit treatment of the mat progressively and to be discharged as a neutral product at the downstream end.

The thickened mat first is washed with recycled filtrate applied by a shower head 33 to displace entrained generator liquor from the mat. A plurality of shower heads 34 is provided at longitudinally spaced-apart locations along the vacuum filter belt 30, each fed with hot water by line 36 to form a hot water shower which is sprayed onto the mat of sodium sesquisulfate, in each dead zone before a vacuum box 32. The hot water percolates through the mat of crystalline material and converts the sodium sesquisulfate to neutral anhydrous sodium sulfate by diffusion leaching. The resulting acid medium is drawn through the belt 30 by vacuum applied to the vacuum boxes 32 via lines 38. The entire filtering zone is enclosed by a hood 39. The acid medium is collected in collecting tanks 40, while the collecting tanks 40 also are connected to a vacuum ejector 42 by line 44. Waste steam from the vacuum ejector may be forwarded by line 46 to steam nozzles 48 located inside the hood 39 to provide heat to maintain the desired temperatures of the mat of crystalline sodium sesquisulfate.

Drain lines 50 from the third and fourth collecting tanks 40 merge together and a filtrate of lower acidity provided thereby optionally is recycled by line 52 to the sprayer 33 for washing the mat free from entrained spent generator liquor. Drain lines 54 from the first and second collecting tanks 40 merge together and the combined stream is recycled to the chlorine dioxide generator by line 56.

The mat of neutral anhydrous sodium sulfate is discharged from the downstream end of the belt 30 into a tank 58. To ensure complete discharge and a clean wire, a compressed air shower 60 and a hot water shower 62 spray onto the wire.

By utilizing the equipment of FIG. 1, an improved one step metathesis procedure is carried out. An aqueous acid containing medium for recycle by line 56 of up to about 6.5 normal can be produced along with discharge of neutral anhydrous sodium sulfate from the end of the belt. Preferably, the aqueous acid containing medium has a total acid normality of greater than about 4.8 normal, more preferably from about 5.5 to about 6.5 normal.

Production of aqueous media of such normality minimizes the evaporative load placed on the chlorine dioxide generator 12 by recycle of such acid by line 56. Alternatively, the aqueous acid media formed is forwarded for other uses, such as in tall oil production or effluent pH control. Generally, the overall quantity of water to sodium sesquisulfate employed in the multiple step leachings is less than about 0.6:1, preferably about 0.4 to about 0.6:1.

EXAMPLES

Example 1

Sodium sesquisulfate containing 17.8% acid was placed on a filter and sprayed with hot water at 90° C. four times. Vacuum was applied between each leaching step. The ratio of total water used in the sprayings to solid sodium sesquisulfate was 0.55:1. Residual acid in the crystalline cake was 1.9%. The metathesis efficiency reached 95.3%.

Example 2

The procedure of Example 1 was repeated except that a steam hood was placed on the filter with a gentle steam blow. The sodium sesquisulfate leached containing 18% acid values initially and, following four steps of water leaching at 90° C., the sodium sesquisulfate contained 0.6% residual acid, corresponding to a metathesis efficiency of 98.8%. The ratio of total water used to solid sesquisulfate was 0.45:1.

SUMMARY OF DISCLOSURE

In summary of this disclosure, the present invention provides an improved metathesis process for recovery acid values from sodium sesquisulfate produced by a chlorine dioxide-generating process for reuse in such process and for producing neutral anhydrous sodium sulfate, by effecting a dynamic leaching of the sodium sesquisulfate. Modifications are possible within the scope of this invention.

What we claim is:

1. A process for the conversion of sodium sesquisulfate to neutral anhydrous sodium sulfate, which comprises:
   conveying a bed of said solid crystalline sodium sesquisulfate on a horizontal vacuum filter belt, and
   spraying water at a temperature of about 40° to about 100° C. onto said bed at a plurality of longitudinally-adjacent locations along the length of said conveyor to leach said sodium sesquisulfate in solid crystalline form in a plurality of individual leaching steps with said sprayed water, to effect conversion of at least a substantial proportion of said solid crystalline sodium sesquisulfate to neutral anhydrous sodium sulfate at least partially in crystalline form and to form an aqueous acid containing medium having a total acid normality of up to about 6.5 normal, and
   drawing said aqueous acid containing medium from said bed on the conveyor.

2. The process of claim 1 wherein said aqueous acid-containing medium has a total acid normality greater than about 4.8 normal.

3. The process of claim 2 wherein said total acid normality is from about 5.5 to about 6.5 N.

4. The process of claim 2 where the weight ratio of the overall quantity of water to sodium sesquisulfate employed in said multiple leachings is less than about 0.6:1.

5. The process of claim 4 wherein the weight ratio is from about 0.4:1 to about 0.6:1.

6. The process of claim 1 wherein steam is drawn through a bed of solid sodium sesquisulfate to maintain the bed temperature.

7. A process for the production of chlorine dioxide, which comprises:
   reducing chlorate ion in an aqueous acid medium having a total acid normality of from about 5 to about 11 normal and containing sulfuric acid to form chlorine dioxide in a reaction zone from said aqueous acid reaction medium,
   maintaining said aqueous acid reaction medium at its boiling point under a subatmospheric pressure applied to said reaction zone and precipitating a by-product acid sulfate in said reaction zone from said aqueous acid reaction medium,
   removing said precipitated by-product acid sulfate from said reaction zone,
   effecting a plurality of individual leaching steps on said solid crystalline sodium sesquisulfate by spraying water at a temperature of about 40° to about 100° C. onto a bed of said solid crystalline sodium sesquisulfate to effect conversion of at least a substantial proportion of said solid crystalline sodium sesquisulfate to neutral anhydrous sodium sulfate at least partially in crystalline form to form an aqueous acid containing medium having a total acid normality of up to about 6.5 normal, and
   drawing said aqueous acid containing medium from said bed and recycling said aqueous acid containing medium to said reaction zone.

8. The process of claim 7 wherein the temperature is from about 70° C. to about 90° C.

9. The process of claim 7 wherein said bed of said solid crystalline sodium sesquisulfate is conveyed on a horizontal vacuum filter belt and water is sprayed onto said bed at a plurality of longitudinally-adjacent locations along the length of said conveyor.

10. The process of claim 9, wherein:
    said precipitated by-product acid sulfate is removed from said reaction zone having said aqueous acid reaction medium entrained therein,
    said removed by-product acid sulfate is washed substantially free from said entrained reaction medium by leaching with water on said horizontal vacuum filter belt and the resulting washed by-product acid sulfate is subjected to said multiple leaching operations, and
    said solid phase neutral anhydrous sulfate is washed free from entrained aqueous acid medium by leaching with water on said horizontal conveyor following said multiple leaching operations.

11. The process of claim 10 wherein said aqueous acid medium has a total acid normality of greater than about 4.8 normal.

12. The process of claim 11 wherein said total acid normality is from about 5.5 to about 6.5.

13. The process of claim 7 wherein said reduction is effected using methanol.

14. The process of claim 7 wherein said reduction is effected using hydrogen peroxide.

* * * * *